United States Patent [19]

Pickett

[11] Patent Number: 4,509,462
[45] Date of Patent: Apr. 9, 1985

[54] PET HITCHING DEVICE

[76] Inventor: Bobby L. Pickett, 3 Tuck Cir., Lemmon Valley, Nev. 89506

[21] Appl. No.: 611,084

[22] Filed: May 17, 1984

[51] Int. Cl.³ .............................................. A01K 1/04
[52] U.S. Cl. .................................... 119/117; 119/121
[58] Field of Search ....................... 119/117, 121, 122

[56] References Cited

U.S. PATENT DOCUMENTS

| D. 245,032 | 7/1977 | Hoffmann | 119/117 |
|---|---|---|---|
| 1,699,308 | 1/1929 | Postings | 119/117 |
| 1,753,506 | 4/1930 | Florine | 119/121 |
| 1,847,570 | 3/1932 | McLaughlin | 119/121 |
| 2,087,176 | 7/1937 | Webb | 119/121 |
| 2,551,540 | 5/1951 | Johnson | 119/121 |
| 2,790,419 | 4/1957 | Sullivan | 119/121 |
| 2,812,743 | 11/1957 | Dustin | 119/117 |
| 2,956,543 | 10/1960 | Kirk | 119/121 |
| 2,981,230 | 4/1961 | Putnam | 119/117 |
| 3,508,525 | 4/1970 | Sawyer | 119/117 |
| 3,896,769 | 7/1975 | McGehee | 119/122 |

Primary Examiner—Paul J. Hirsch
Attorney, Agent, or Firm—Jacobi, Siegel, Presta, Marzullo & Aronson

[57] ABSTRACT

A pet hitching device comprising an elongated section that may be mounted in substantially vertical relation on an adjacent upright support such as a fence post, house or the like. The elongated section merges upwardly with a generally U-shaped upper section that terminates in a downwardly extending end portion. A disk member is rotatably mounted on the end portion in a substantially horizontal plane. An eye hook is secured to the disk member so that a leash or the like may be tied or attached thereto for the purpose of securing a dog or other pet to the hitching device.

5 Claims, 3 Drawing Figures

PET HITCHING DEVICE

BACKGROUND OF THE INVENTION

The present invention relates to a pet hitching device and, more particularly, to such a device that provides a maximum amount of movement and freedom for the pet secured to the device.

Many different types of pet leashing or hitching devices have been used in the past and are being used at present. Although these devices have generally served the purpose, they have been subject to one or more of the following disadvantages:

1. They have not provided enough freedom of movement for the pet secured to the device;
2. They have been easily broken by the pet secured thereto;
3. They have been complicated in construction and thus difficult and expensive to manufacture;
4. They have been difficult to secure to a support member, the ground or the like; and/or
5. Because of their construction, they have posed a danger to the pet secured thereto.

The pet hitching device of the present invention is not subject to any of the above-mentioned disadvantages and possesses many advantages not found in the leashing or hitching devices previously and presently used.

SUMMARY OF THE INVENTION

The hitching device of the present invention is especially useful for pets such as dogs. It comprises an elongated section that may be rotatably mounted in substantially vertical relation on an adjacent upright support such as a fence post, the side of a house or the like. The elongated section merges with a generally U-shaped upper section that terminates in a downwardly extending end portion that has a disk member rotatably mounted thereon in a substantially horizontal plane. An eye hook is secured to the disk member so that a leash or the like may be tied or attached thereto for the purpose of securing a pet to the hitching device.

DESCRIPTION OF THE PREFERRED EMBODIMENT

Figure 1:
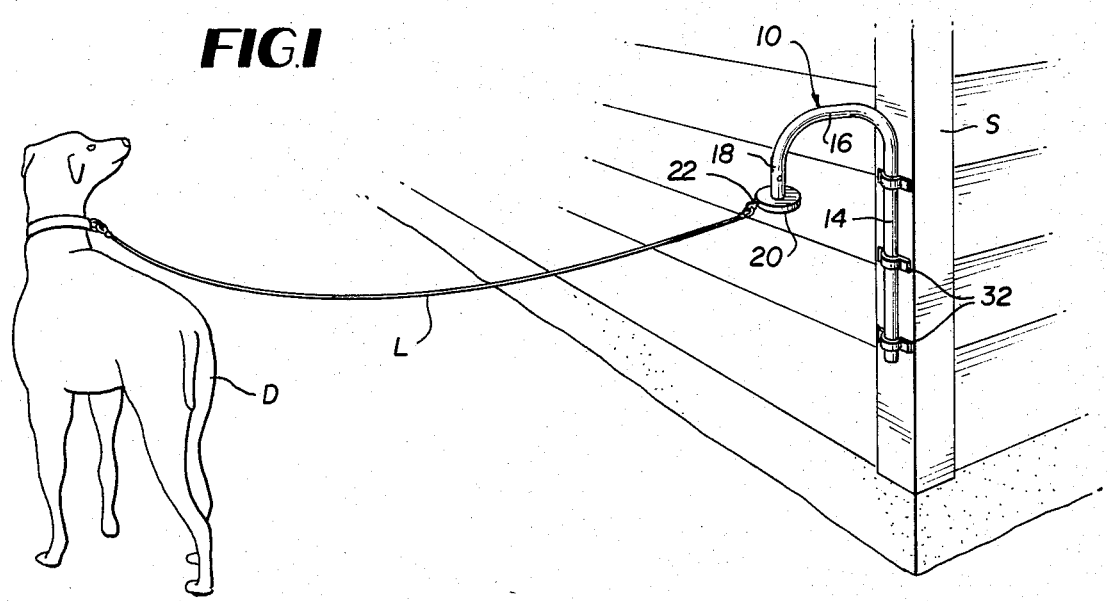
FIG. 1 is a perspective view of a hitching device constructed in accordance with the principles of the present invention, showing a pet secured thereto.
Figure 2:
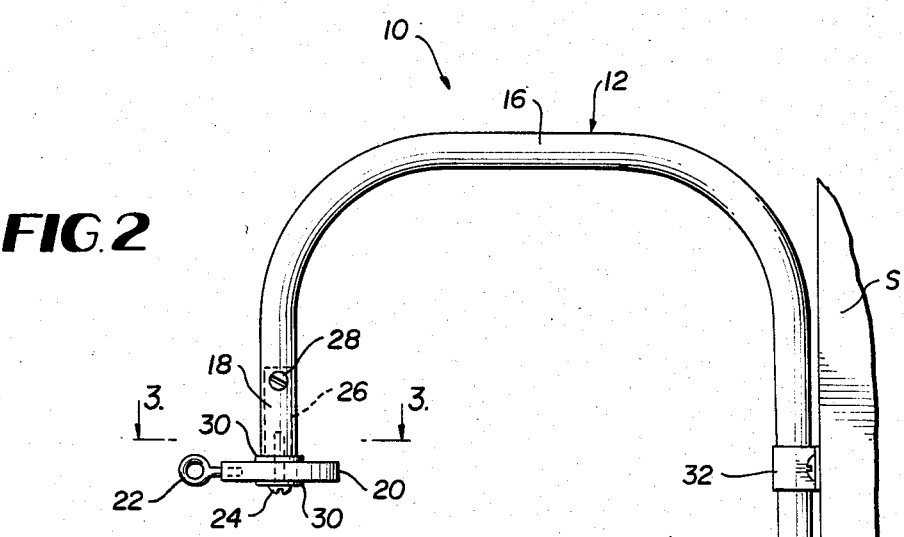
FIG. 2 is an enlarged side elevational view of the hitching device shown in FIG. 1.

As shown in FIGS. 1 and 2, the pet hitching device 10 of the present invention comprises an elongated member 12, preferably of tubular construction, having a generally vertically extending elongated section 14 that merges at its upper end with a U-shaped section 16 that terminates in a generally downwardly extending end portion 18 that is shorter in length than the vertically extending section 14.

Figure 3:
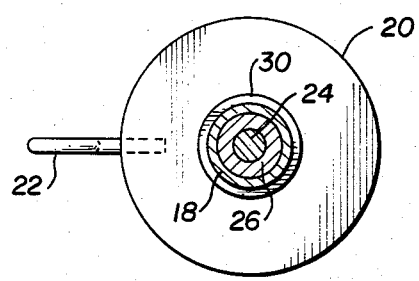
FIG. 3 is an enlarged sectional view taken substantially along line 3—3 in FIG. 2.

An annular or disk member 20 of any suitable construction is rotatably mounted in a generally horizontal plane on the end of the end portion 18 of the elongated member 12. An eye hook 22 is secured to the side of the rotatable disk member for the purpose of facilitating the attachment of a leash L or the like thereto. Referring to FIGS. 2 and 3, as an illustrative example, the disk member 20 is rotatably connected to the end portion 18 of the elongated member 12 by a bolt 24 that extends through the disk member 20 and is threadably received within an insert 26 secured within the end portion 18 by a screw 28 or the like. A pair of washers 30 are positioned between the disk member 20 and the bolt head 24 and end portion 18 for the purpose of facilitating the rotary movement of the disk member.

The hitching device 10 may be conveniently mounted on a generally vertically extending support, such as a fence post, the side of a house or the side of a garage. This is accomplished by a plurality of generally U-shaped mounting clips or brackets 32 that are positioned over the vertically extending section 14 of the elongated member 12 in vertically spaced relation. The clips 32 are adapted to be secured to the support S by any suitable means, such as screws or the like.

From the foregoing description, it will be apparent that a dog D or other pet on a leash L can be conveniently secured to the hitching device 10 of the present invention by attaching the free end of the leash L to the eye hook 22 secured to the rotatable disk member 20. Because of the rotation of the disk member 20 and thus the hook 22 secured thereto, the dog D or other pet secured thereto has considerable freedom of movement. Also, the hitching device 10 can be positioned at a desired height on the support S so as to minimize strain on the dog D when pulling on the leash L.

As an additional feature, the vertically extending section 14 of the elongated member 12 can be rotatably mounted within the clips 32 secured to the support S to allow even greater freedom of movement to the dog D or other pet secured thereto.

The hitching device 10 of the present invention may be formed of any suitable materials, such as metal or the like.

We claim:

1. A pet hitching device for a vertical support, comprising:
    an elongated member having a generally vertically extending section that merges upwardly into a generally U-shaped upper section having a downwardly extending end portion that is shorter than said vertically extending section,
    a disk member rotatably mounted on said end portion in a substantially horizontal plane,
    hook means secured to said disk member and adapted to be connected to a pet leash, and
    means for rotatably securing said vertically extending section to said vertical support to position said disk member a predetermined distance above the ground.

2. The hitching device of claim 1 wherein said elongated member is of tubular construction.

3. The hitching device of claim 1 wherein said disk member is mounted on said end portion by a bolt, and washer means are disposed between said bolt and said disk member and between said end portion and said disk member.

4. The hitching device of claim 1 wherein said hook means is an eye hook.

5. The hitching device of claim 1 wherein said securing means comprise a plurality of generally U-shaped clips.

* * * * *